March 20, 1934.    F. L. MORSE    1,951,764
DRIVE CHAIN
Filed March 1, 1928
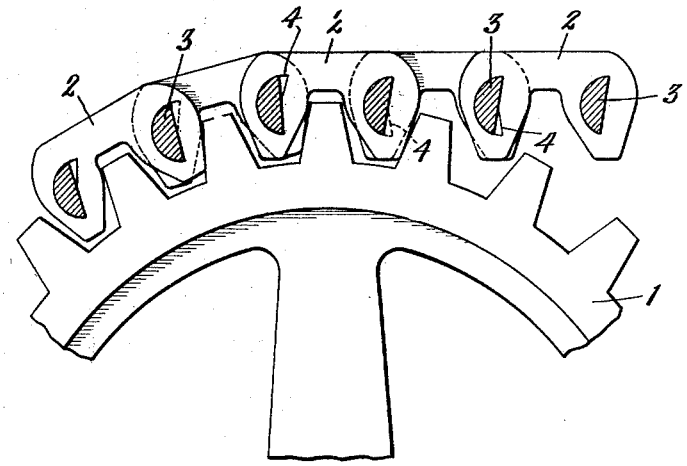
Fig. 1.
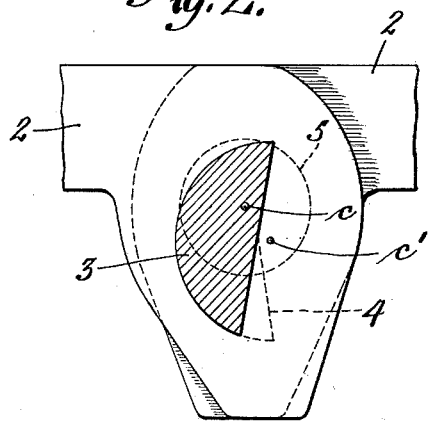
Fig. 2.
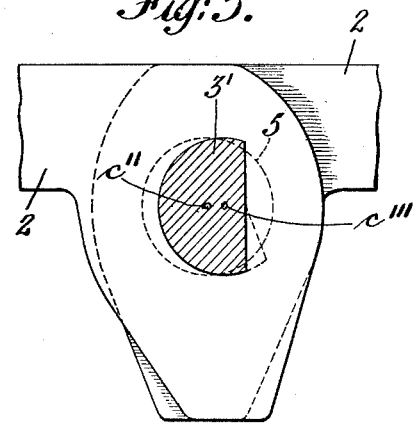
Fig. 3.
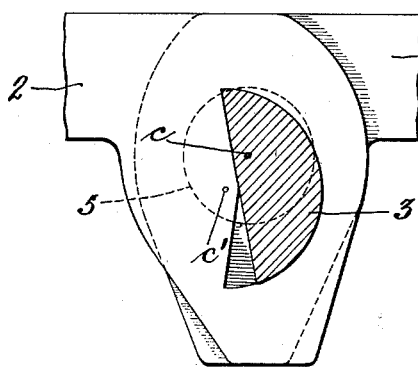
Fig. 4.
Fig. 5.
INVENTOR
Frank L. Morse
BY
Synnestvedt & Lechner
ATTORNEYS Patented Mar. 20, 1934

1,951,764

UNITED STATES PATENT OFFICE 1,951,764

DRIVE CHAIN

Frank L. Morse, Ithaca, N. Y., assignor to Morse Chain Company, Ithaca, N. Y., a corporation of New York Application March 1, 1928, Serial No. 258,377

4 Claims. (Cl. 74—32)

This invention relates to chains used in the transmission of power, particularly those types in which turning or sliding friction is present in the operation of the joints. These joints have previously utilized round or substantially round pintles to connect overlapping links, and the turning friction on the pintles, bushings, links, or other rubbing parts has caused wear which tended to lengthen the pitch of the chain. This wear and lengthening of pitch has been one of the chief factors in shortening the life of such chains, and the present invention has for its chief object the more effective arrangement of the joint in the link so as to increase its bearing area without seriously decreasing the strength of the link. Other objects are to make a simple, easily manufactured, durable and smooth running chain.

It has been customary to locate the pintle holes in the link plates with the center of the hole substantially in the middle of the head or tooth of the link plate. This was especially true where turning friction joints were used, these being generally round or substantially round holes or pintles. Even when the holes or pintles were slightly flattened, the substantially round shape was retained, and the center of the hole or joint remained substantially as before relative to the head of the link plate, and the wearing qualities were not particularly improved. The joint was usually made as large as a circle in the head would permit, but as the size of the head was limited by the tooth gap or pitch, and some metal was required around the hole to carry the tension forces of the chain, there appeared to be little room for improvement.

In the present invention I take advantage of the fact that while the tooth gap is limited, the depth of the head or link can, generally speaking, be made anything desired; and there is, in the ordinary link head, considerable metal not essential to carry tension forces, which affords space for a wider joint bearing, provided a joint properly shaped to fit in that area is used. In general the invention consists in using a substantially half-round or, at least, non-circular pintle, having an arcuate side on which the joint may turn, and locating this pintle with the center of oscillation displaced to one side of the vertical center line of the head of the link, so that the metal of the head is substantially equally distributed around the non-circular hole. This permits a considerable extension of the bearing area downward in the lobe of the head, giving greater wear-resisting ability in a given size link or chain, or on the other hand, if the vertical size of the joint is not increased, it increases the metal of the head around the joint, and, in that way, gives a stronger chain. While either advantage may be gained from the invention, or, to some extent, both advantages in a lesser degree, the extension of the bearing area is in general preferable.

Referring now to the drawing,—

Fig. 1 is a side elevation of a portion of a chain and sprocket, with the end washers removed so as to show the joint construction, partially in cross-section.

Fig. 2 is a larger detail view of a joint and link head illustrating one form of the invention, with an ordinary joint or pintle indicated in dotted lines for purposes of comparison and to show the fact that the center of articulation is shifted to one side.

Fig. 3 is a somewhat similar detail view of joint and head showing, for example, a modification in which the metal of the head around the joint is increased.

Fig. 4 is another modification showing that the pintle may have its curved side reversed in in any of the types, if desired.

Fig. 5 illustrates a further modification in which a bushing is used in the joint to extend the bearing area the full width of the chain.

Referring now to Fig. 1 the sprocket 1 is shown engaged by a chain having links 2, 2, etc., the link plates 2 being generally arch shaped with projecting heads forming teeth adapted to engage the teeth of the sprocket, as is common in chains used for power transmission. While the invention is shown as applied to a chain of the silent type, it will be obvious that it is also applicable to block chains and other types having suitable heads. In its simplest form the joint is composed of a single pintle part 3 having a substantially half-round or segment shaped cross-section, the flat side being fixed to one link or set of link plates and the other set of link plates having a turning fit on the other or rounded side of the pintle 3. The chain can thus bend by each joint turning on the arcuate or rounded side of the pintles 3, just as freely as though the part 3 was completely or substantially a circle,—the pintle holes of the links which turn on the pintle 3 having clearances 4 to permit the turning.

In Fig. 2 the location of a typical pintle of the ordinary round or bush type is indicated by the dotted circle 5, the center being located at $c$; and it will be noted by way of comparison that under the present invention the center of the pintle 3 is displaced to one side, the center of curvature of the pintle 3 being located, for example, at the point $c'$. It will also be noted that without weakening the metal walls of the link head on either side of the pintle 3, the vertical dimension or effective bearing area of the pintle 3 has been considerably increased over that possible with the prior constructions. This is particularly evident when it is borne in mind that with the ordinary round pintle the brunt of the wear falls on a comparatively limited arc on the forward side of the pintles. Under the present invention the really effective portion is used, the pin thus corresponding to a very much larger circular pin—one much larger than could be contained in the head, for example.

In Fig. 2 the straight side of the pintle 3 is tilted somewhat to conform to the side of the head of the link which is inclined to fit the sprocket tooth. The pintle can, of course, be tilted in other directions, or may be vertical as in Fig. 3. The arc of the bearing surface may also be somewhat more than a semi-circle, as shown, for example, in Fig. 3, and the center need not be displaced or may be located wherever best balances the distribution of metal. The shape of the pintle part may vary considerably in degrees of arc and in location of center of curvature, while being in general a segment or approximately a half-round form; and the back, of course, need not necessarily be straight, but may have any suitable shape to key into its link plates, as the turning occurs principally on the other side.

The size of the pintle part 3 in relation to the size of the head of the link 2 may also vary in different installations, according to the purpose, and in Fig. 3 a pintle 3' is shown having a bearing area substantially the same as the ordinary round pintle indicated by the dotted circle 5 having the center $c''$, but it will be noted that the pintle 3', by being displaced with a center at $c'''$, gives a thicker and stronger wall in the link plate around the joint. The pintle 3 in any of the modifications may have its curved side on the back instead of front if desired, as shown, for example, in Fig. 4, the construction of which will be evident from the description given of Figs. 2 and 3.

In Fig. 5 a bushing 6 is shown fitted to turn on the rounded side of the pintle 3, this bushing 6 being secured in the link or set of link plates $2a$ and extending across the width of the chain, while the pintle 3 is keyed to the link or set of link plates $2b$. By extending the bushing 6 across the width of the chain, the transverse bearing area is extended to substantially the full width of the chain, instead of being equivalent to only half that width, as in the non-bushed type of chain where the pintle bears on every other one of the interspersed link plates. These and many other modifications will be obvious to those skilled in the art from a consideration of the basic principles of the invention hereinbefore disclosed.

I claim:—

1. A drive chain comprising in combination a series of links composed of plates having tooth shaped heads, and a friction joint for pairs of said links comprising a pin having one straight keying surface whereby it is keyed in a head of one link against turning and shifting and one convex bearing surface upon which the opposite head of an adjacent link may turn, the center of curvature of the convex bearing surface being displaced in a horizontal direction to one side of the center of the head but arranged so that the center of mass of the pin is sufficiently near the center of mass of the head to provide a substantial amount of metal in the head at the sides of the pin which extend laterally of the length of the chain, and said pin being elongated with its longest dimension extending in the general direction of the vertical dimension of the head.

2. In a power transmission chain the combination of overlapping links having heads forming teeth, pintles extending through said heads and connecting said links, the pintles having a keying face whereby they are keyed in one head of the links against turning and shifting and a curved face upon which the opposite head of adjacent links may turn, the center of curvature of the curved face of the pintle being displaced in a horizontal direction to one side of the center of the head but arranged so as to provide a substantial amount of metal in the head at the sides of the pintle which extend laterally of the length of the chain, whereby the effective bearing surface of the pintle may be substantially increased without materially weakening the head.

3. A drive chain comprising in combination a series of links composed of plates having heads, and a friction joint for pairs of said links comprising a pin having one convex bearing surface and one straight keying surface, the center of curvature of the convex bearing surface being displaced in a horizontal direction to one side of the center of the head but arranged so that the center of mass of the pin is sufficiently near the center of mass of the head to provide a substantial amount of metal in the head at the sides of the pin which extend laterally of the length of the chain, and said pin being keyed against turning and shifting in the head of one link by means of said keying surface, and the adjacent link being adapted to frictionally turn on said convex bearing surface under load.

4. In a power transmission chain, the combination of overlapping links having heads, and a friction joint for pairs of said links comprising a segmental pin having a cross section approximating a semi-circle and including a straight keying surface and an arcuate working surface, the center of curvature of the arcuate working surface of the pin being displaced in a horizontal direction to one side of the center of the head but arranged so that there is a substantial amount of metal in the head at the sides of the pin which extend laterally of the length of the chain, one link being provided with an aperture for non-rotatably and non-shiftably receiving said pin with the straight keying surface facing outwardly of the link and the arcuate working surface facing inwardly of the link, and the other link being provided with an aperture having an arcuate working wall corresponding in curvature to the curvature of the arcuate working surface of the pin but of greater circumferential extent, said aperture also having a wall providing turning clearance for the pin in the aperture, and said last mentioned wall being disposed inwardly of the link with respect to the arcuate working wall.

FRANK L. MORSE.